United States Patent

Shalai et al.

[11] 4,233,490
[45] Nov. 11, 1980

[54] METHOD OF REINFORCING ALUMINIUM ALLOY PISTON RING GROOVE

[76] Inventors: Alexandr N. Shalai, ulitsa Budapeshtskaya, 98, korpus, 3, kv. 88; Mikhail D. Nikitin, Novoizmailovsky prospekt, 27, kv. 52; Nikolai I. Zakharov, ulitsa Avtovskaya, 2, kv. 112, all of Leningrad; Anatoly P. Bratchenko, ulitsa Kievskaya, 3b, kv. 39, Michurinsk Tambovskoi oblasti, all of U.S.S.R.

[21] Appl. No.: 50,468

[22] Filed: Jun. 20, 1979

[51] Int. Cl.³ .................. B23K 9/00; B23P 15/10
[52] U.S. Cl. .................. 219/121 P; 219/137 R; 219/76.16; 277/189.5; 148/13; 29/156.63; 92/222
[58] Field of Search ............ 219/121 P, 121 R, 69 M, 219/69 W, 75, 76.16, 121 EM, 137 R; 228/170, 165, 174; 427/34; 29/156.5 R, 156.63; 277/189.5; 148/13; 92/222

[56] References Cited

U.S. PATENT DOCUMENTS

| | | | |
|---|---|---|---|
| 3,014,771 | 12/1961 | Nichols | 277/189.5 |
| 3,642,519 | 2/1972 | Tiner et al. | 427/34 |
| 3,715,790 | 2/1973 | Reinberger | 277/189.5 |
| 4,074,616 | 2/1978 | Gale et al. | 277/189.5 |

*Primary Examiner*—B. A. Reynolds
*Assistant Examiner*—M. Paschall
*Attorney, Agent, or Firm*—Burgess, Ryan and Wayne

[57] ABSTRACT

Disclosed is a method of reinforcing an aluminium alloy piston ring groove wherein the piston body is fused to a certain depth around the periphery thereof in the zone where the ring groove is to be cut, with simultaneous introduction of an alloying addition into the fused aluminium alloy of the piston body, thus forming an annular wear-resistant weld therein, whereupon the ring groove is cut in the periphery of said weld.

7 Claims, 8 Drawing Figures

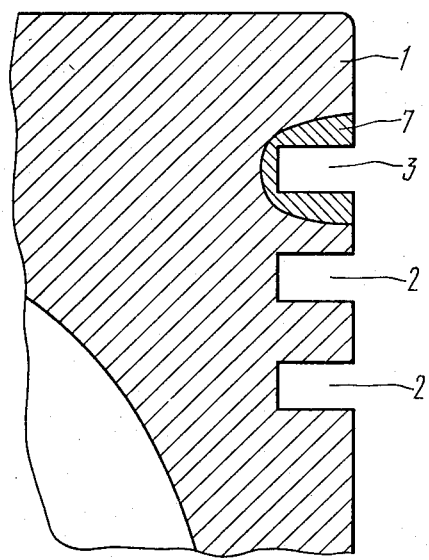
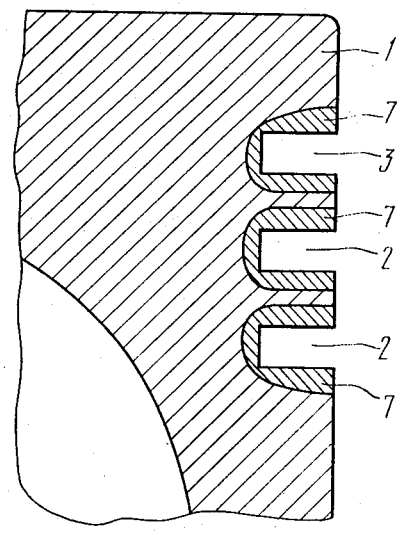
FIG. 1
FIG. 8

METHOD OF REINFORCING ALUMINIUM ALLOY PISTON RING GROOVE

FIELD OF THE INVENTION

The present invention relates to aluminium alloy pistons, and more particularly to methods of reinforcing ring grooves in such pistons.

The invention can most advantageously be used when making pistons for internal combustion engines, compressors, piston pumps, and the like.

BACKGROUND OF THE INVENTION

It is common knowledge that heavy duty internal combustion engines using aluminium alloy pistons are subject to the difficulty that walls of the piston ring grooves cut in the piston head are subject to extreme and deformation in use, thus causing engine failure. Because of this, reinforcement of the ring groove area has become a necessity.

At present, much attention is centered on the provision of ring groove reinforcements by spraying a wear-resistant metal into the preformed peripheral recess whose dimensions exceed the final dimensions of the groove receiving the piston ring.

There is well known a method of making an aluminium alloy piston with a ring groove reinforcement (cf. French Pat. No. 2122,4). Among other things, this method ensures the reinforcement of the top ring groove provided in the aluminium alloy piston. Experience has shown that in the course of operation of internal combustion engines, the top ring grooves show the worst wear. The first step of the method in question consists of forming a peripheral recess in the piston body adjacent its top face, the dimensions of said recess exceeding the final dimensions of the groove for receiving the top piston ring. Then the piston body is heated up to a temperature ranging from 165° to 200° C. and, while the temperature of the piston body is maintained in the stated range, a bonding metal is sprayed on the surface of the peripheral recess, whereupon a wear-resistant metal is sprayed into the peripheral recess to fill it, the temperature of the piston body being within the stated range.

In this method, nickel aluminide is used as a bonding metal, and stainless steel is used as a wear-resistant metal. The wear-resistant metal layer is bonded through the bonding metal to the aluminium alloy of the piston body.

After cooling the piston body, the final step is performed consisting in machining in the wear-resistant metal a groove for receiving the top piston ring of the specified size.

Said method improves significantly the ring groove reinforcement in the piston body but is a very labour-consuming process because of the necessity to perform, prior to forming the ring groove, the peripheral recess and to spray the bonding metal over the surface of said recess.

Moreover, the bonding metal layer fails to provide a sufficient strength of the bond between the piston alloy and the sprayed wear-resistant metal, since the piston under operation is subjected to thermal and mechanical stresses, which, in turn, results in the formation of cracks in the bonding metal layer, thus causing chipping and flaking off of the wear-resistant metal layer and, finally, piston failure.

It is also known to provide the ring groove reinforcement in an aluminium alloy piston by means of an insert formed as an annular wear-resistant weld deposited in the piston body.

Known to the prior art is a method of reinforcing an aluminium alloy piston ring groove (cf. U.S. Pat. No. 3,014,771) and in particular, of reinforcing a top ring groove in such a piston.

To provide the top ring groove reinforcement by this method, an annular recess is cut adjacent the piston top face, the dimensions of the annular recess exceeding the final dimensions of the top ring groove to be formed. Thereupon, an annular wear-resistant weld is formed by depositing a wear-resistant metal within the annular recess, thus forming an insert having particles of the wear-resistant metal.

The weld may be deposited by gas welding or by electric arc welding with a filler rod having a matrix of an alloy that should bond securely to the material of the piston body.

In the case of an aluminium alloy piston, the rod matrix should be a related aluminium alloy containing particles of hard durable material, such as ferrous alloy, evenly dispersed therein.

Thus, the weld matrix is a related aluminium alloy which is bonded securely to the piston alloy.

Moreover, the desired durability is imparted to the weld by the ferrous particles evenly dispersed in the aluminium alloy of the weld matrix.

The machining of the top ring groove into the weld can be done by conventional means.

As compared to the above method, the method in question enables the strength of the bond between the piston alloy and the weld material to be increased, since the weld is formed with a related aluminium alloy.

However, this method is also a labour-consuming process because of the necessity to preform the annular recess in the piston body.

Furthermore, during the deposition of the weld in the annular recess of the aluminium alloy piston body, inevitable defects peculiar to the welding of aluminium alloys occur in the fusion area, which defects reside in gas and oxide inclusions and in faulty fusion, and are the cause of the generation of stress concentrations initiating cracks in the fusion area under the action of thermal and mechanical stresses.

This decreases drastically the strength of the bond between the weld material and the piston alloy, thus causing the piston failure.

SUMMARY OF THE INVENTION

It is an object of the present invention to provide a method of reinforcing an aluminium alloy piston ring groove, simplifying the process of the weld formation in the piston body.

Another object of the present invention is to increase the strength of the bond between the wear-resistant material of the weld and the piston alloy.

With these and other objects in view, there is provided a method of reinforcing an aluminium alloy piston ring groove, wherein an annular weld of a wear-resistant material is preformed in a piston body whereupon a piston ring groove is cut in the periphery of said weld, wherein, according to the invention, the piston body is fused to a certain depth around the periphery thereof in the zone where the ring groove is to be cut, with simultaneous introduction of an alloying addition into the molten piston alloy, thus forming the annular wear-resistant weld.

The method of the invention permits the annular wear-resistant weld to be formed in the piston body without preforming in the latter an annular recess. This considerably simplifies the piston manufacturing process.

Moreover, according to the present invention, the weld matrix is the aluminium alloy of the piston body, whereby an increased strength of the bond between the weld material and the piston alloy is achieved.

It is desirable to provide the fusion penetration into the piston body to a depth of 0.3 to 1.3 times the final depth of the ring groove:

On the one hand, a portion of the end surface of the ring groove subjected to the worst wear extends for a depth from 0.3 to 0.5 of the depth of said groove. Therefore, the minimum depth of the weld should not be less than 0.3 of the ring groove depth.

On the other hand, when making a piston ring groove cut completely in the weld, it is desirable that the weld be restricted to a depth of 1.3 times the final depth of the ring groove, since the further fusion penetration in the piston body does not increase the durability of the ring groove cut therein.

It is desirable to use nickel as an alloying addition.

A product of interaction of nickel with the aluminium alloy of the piston body is nickel-aluminide having hardness of 600 to 1000 kg/mm$^2$. The desired durability is imparted to the weld by particles of nickel-aluminide evenly dispersed throughout the molten aluminium alloy.

It is also advisable to use a nickel-chromium alloy as an alloying addition.

In this case, interaction of the nickel-chromium alloy with the molten aluminium alloy results in the formation of nickel and chromium aluminides increasing the durability of the weld. The presence of chromium in the aluminium alloy makes it possible to enhance the heat resistance of the weld material.

It is also advisable that, prior to fusion process, the piston body be heated up to a temperature from 100° to 300° C., and the temperature of the piston body be maintained constant within the stated range by cooling the piston body with compressed air during the fusion process.

Preheating of the piston body to a specified temperature and maintaining of said temperature constant within the stated range in the course of the weld formation, contributes to the uniform fusion penetration in the piston alloy in depth and to the even distribution of the alloying addition particles through the whole length of the weld.

Moreover, the preheating of the piston body decreases residual stresses arising in the weld when cooling the piston body after the fusion process is finished. This, in turn, increases the strength of the bond between the weld material and the piston alloy.

Other and further objects and advantages of the invention will be better understood from the following description taken in conjunction with the accompanying drawings illustrating a preferred embodiment of the invention, wherein:

BRIEF DESCRIPTION OF THE INVENTION

FIG. 1 is a sectional view of a portion of a piston body having a plurality of ring grooves, the top ring groove being formed in the periphery of an insert made as an annular wear-resistant weld provided in the piston body;

FIG. 8 is a sectional view of a portion of a piston body having a plurality of ring grooves each formed in the periphery of an insert made as an annular wear-resistant weld provided in the piston body.

DETAILED DESCRIPTION OF THE INVENTION

Referring now to the accompanying drawings and initially to FIG. 1, numeral 1 indicates the body of a piston of an internal combustion engine. The piston body 1 is made of aluminium alloy and is provided with two ring grooves 2 and a top ring groove 3.

By way of illustration, the proposed method will be further described referring to the top ring groove 3.

Figure 2:
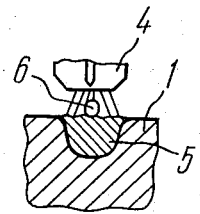
FIG. 2 illustrates schematically the process of fusing the piston body by means of a heat source in the zone where the top ring groove is to be cut.

Prior to the fusion process, the piston body 1 is heated up to a temperature within the range from 100° to 300° C. By means of a heat source 4, the piston body 1 (FIG. 2) is fused to a certain depth around the periphery thereof in the zone where the top ring groove 3 is to be cut.

The fusion penetration in the piston body 1 is carried out by rotating the latter about its axis with respect to the fixedly mounted heat source 4 and is performed to a depth of 0.3 to 1.3 times the final depth of the groove 3.

Concurrent with the fusion process, an alloying addition 6 is introduced into the molten piston alloy. In one embodiment, the alloying addition 6 is a nickel-containing rod. In another embodiment, the alloying addition 6 is a nickel-chromium alloy rod.

Throughout the fusion process, the temperature of the piston body 1 is maintained constant within the stated range of 100° to 300° C. by cooling it with compressed air.

Figure 3:
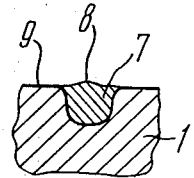
FIG. 3 is a sectional view of a portion of a piston body with a wear-resistant annular weld formed therein.

After finishing the fusion process, an annular wear-resistant weld 7 (FIG. 3) is formed in the periphery of the piston body 1. The weld matrix is the piston alloy wherein particles of nickel aluminide, in accordance with one embodiment, or of chromium aluminide, in accordance with another embodiment of the invention, are homogeneously distributed.

Figure 4:
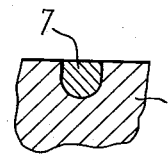
FIG. 4 is a sectional view of a portion of a piston body with an annular wear-resistant weld shown after machining off flush with the outer wall of the piston.
Figure 5:
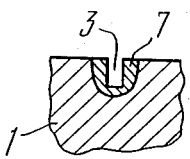
FIG. 5 is a sectional view of a piston body with a top ring groove cut in the periphery of the annular wear-resistant weld.

The outer surface 8 of the weld 7 thus obtained is rather rough and projects outward the piston outer surface 9. Therefore, the piston body is then to be machined (FIG. 4) to remove excess wear-resistant metal of the weld 7 and to trim the piston body 1 to final dimensions. The final step consists in cutting the top ring groove 3 (FIG. 5) of specified dimensions in the periphery of the weld 7.

Figure 6:
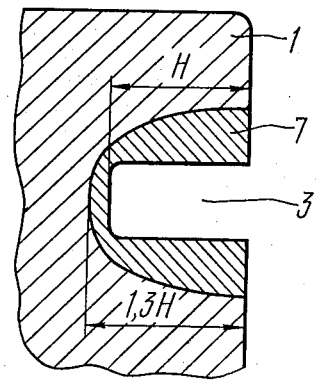
FIG. 6 is a sectional view of a portion of a piston body with the top ring groove cut in the periphery of the annular wear-resistant weld, the weld depth being 1.3 times the final depth of said groove.

In one embodiment shown in FIG. 6, the annular wear-resistant weld 7 extends into the piston body 1 to a depth exceeding the depth of the top ring groove 3, 1.3 times. In this case, there is provided the reinforcement of the entire surface of the ring groove 3.

Figure 7:
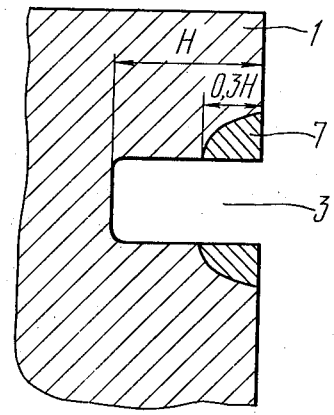
FIG. 7 is the same, the weld depth being 0.3 times the final depth of the ring groove.

In accordance with the other embodiment shown in FIG. 7, the annular wear-resistant weld 7 extends into the piston body to a depth of 0.3 times the final depth of the piston ring groove 3. In this case, reinforcement is provided only for that portion of the groove 3 which is liable to the worst wear in operation.

The proposed method has been described hereinabove as applied to the top ring groove reinforcement. However, if necessary, it can be successfully used to reinforce the ring grooves 2 as shown in FIG. 8.

The proposed method was realized when manufacturing aluminium alloy pistons 210 mm in diameter for internal combustion engines.

The piston body was preheated up to a temperature of 200° C.

Next, the piston body was exposed to the plasma jet of the plasma torch in the zone where the top ring groove was to be cut, the piston body being rotated about its axis with respect to the fixedly mounted plasma torch. The fusion penetration was provided into the piston body to a depth of 6,5 mm, i.e. to a depth of 0.8 times the specified depth of the top ring groove. Simultaneously with the fusion process, an alloying addition, namely nickel rod was introduced into the piston alloy under melting.

Throughout the fusion process, the piston body was cooled with compressed air having a temperature of 20° to 30° C., thus maintaining the piston temperature constant at 200° C.

Prior to forming the ring groove in the periphery of the annular wear-resistant weld, the latter was put through a metallographic test.

The metallographic test revealed that the weld had a heterogeneous fine-grained structure.

The heterogeneous structure of the weld material is due to solid fine-grained particles of nickel aluminide dispersed in the aluminium alloy of the piston body, which particles impart the desired durability to the weld.

Moreover, the weld thus obtained is free from areas of pour fusion and its total porous volume does not exceed 0.2 percent of the weld volume.

The metallographic test has revealed no sharp demarcation line between the weld material and the piston alloy which is evidence of an increased strength between the above mentioned materials.

The proposed method used in piston manufacturing ensures a substantial decrease (up to 1.5 to 2 times) in the use of labour as compared to the prior art methods.

While a particular embodiment of the invention has been shown and described, various modifications thereof will be apparent to those skilled in the art and therefore it is not intended that the invention be limited to the disclosed embodiment or to the details thereof and the departures may be made therefrom within the spirit and scope of the invention as defined in the appended claims.

What is claimed is:

1. A method of reinforcing an aluminium alloy piston ring groove, wherein an annular wear-resistant weld is formed by fusing the piston body to a certain depth around the periphery thereof in the zone where a ring groove is to be cut, with simultaneous introduction of an alloying addition into the molten piston alloy, whereupon the ring groove is cut in the periphery of said weld.

2. A method as claimed in claim 1, wherein said fusion penetration is provided in said piston body to a depth of 0.3 to 1.3 times the final depth of said ring groove.

3. A method as claimed in claim 1, wherein said alloying addition is nickel.

4. A method as claimed in claim 1, wherein said alloying addition is a nickel-chromium alloy.

5. A method as claimed in claim 1, wherein, prior to fusion, said piston body is heated up to a temperature ranging from 100° to 300° C., said temperature being maintained constant within the stated range by cooling said piston body with compressed air throughout the fusion process.

6. A method as claimed in claim 3, wherein the alloy is nickel aluminide.

7. A method as claimed in claim 5 wherein said piston body is preheated up to a temperature of 200° C.

* * * * *

UNITED STATES PATENT AND TRADEMARK OFFICE
CERTIFICATE OF CORRECTION

PATENT NO. : 4,233,490

DATED : November 11, 1980

INVENTOR(S) : Alexandr N. Shalai, et al

It is certified that error appears in the above—identified patent and that said Letters Patent is hereby corrected as shown below:

Column 1, line 17: After "extreme" insert --wear--.

Signed and Sealed this

Twenty-first Day of July 1981

[SEAL]

Attest:

GERALD J. MOSSINGHOFF

Attesting Officer — Commissioner of Patents and Trademarks

Notice of Adverse Decision in Interference

In Interference No. 100,774, involving Patent No. 4,233,490, A.N. Shalai, M. D. Nikitin, N. I. Zakharov and A. P. Bratchenko, METHOD OF REINFORCING ALUMINIUM ALLOY PISTON RING GROOVE, final judgment adverse to the patentees was rendered May 25, 1982, as to claims 1 and 3.

[*Official Gazette August 17, 1982.*]